Figure 1:
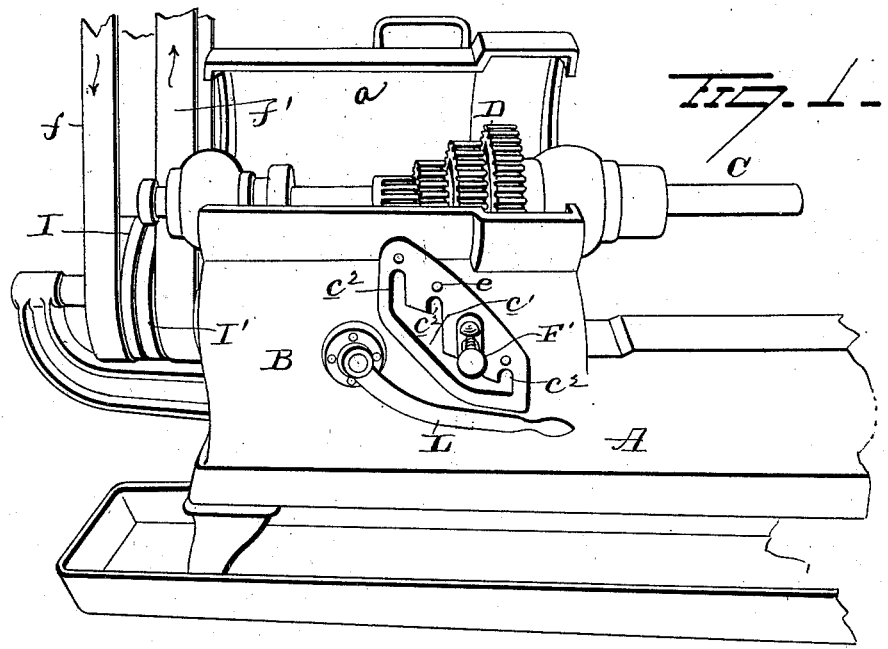

No. 691,963. Patented Jan. 28, 1902.
W. P. NORTON.
SPEED CHANGING AND REVERSING MECHANISM.
(Application filed Nov. 3, 1900.)
(No Model.) 3 Sheets—Sheet 1.

WITNESSES
E. J. Nottingham
G. F. Downing

INVENTOR
W. P. Norton
By H. A. Seymour
Attorney

No. 691,963. Patented Jan. 28, 1902.
W. P. NORTON.
SPEED CHANGING AND REVERSING MECHANISM.
(Application filed Nov. 3, 1900.)
(No Model.) 3 Sheets—Sheet 2.
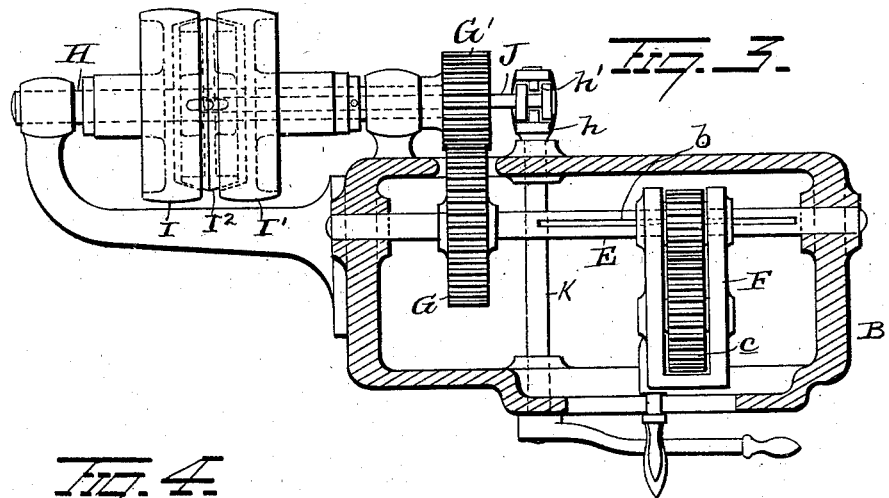
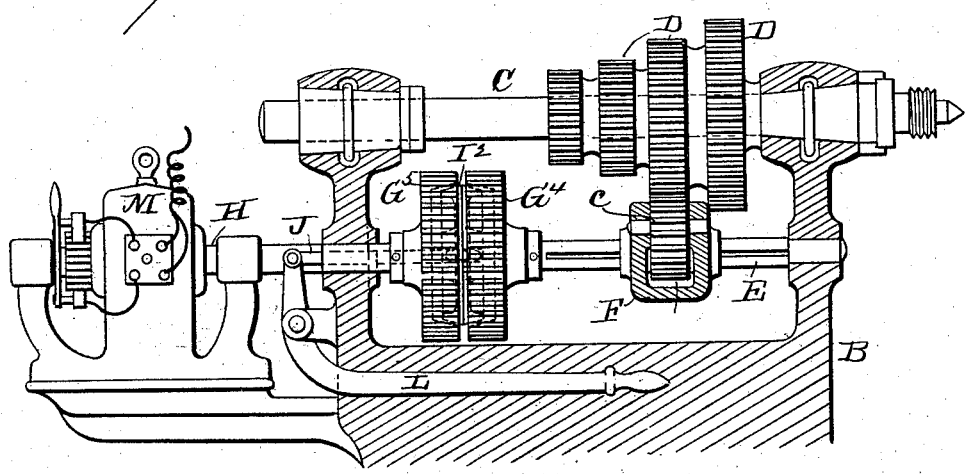
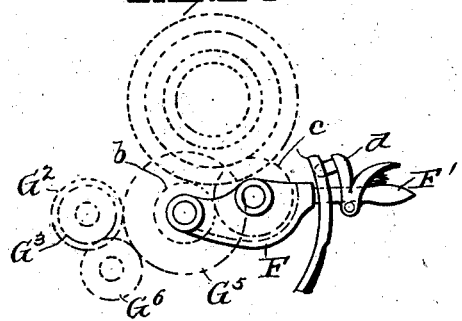
WITNESSES
E. J. Nottingham
G. F. Downing
INVENTOR
W. P. Norton
By H. A. Seymour
Attorney
THE NORRIS PETERS CO., PHOTO-LITHO., WASHINGTON, D. C.

No. 691,963. Patented Jan. 28, 1902.
W. P. NORTON.
SPEED CHANGING AND REVERSING MECHANISM.
(Application filed Nov. 3, 1900.)
(No Model.) 3 Sheets—Sheet 3.
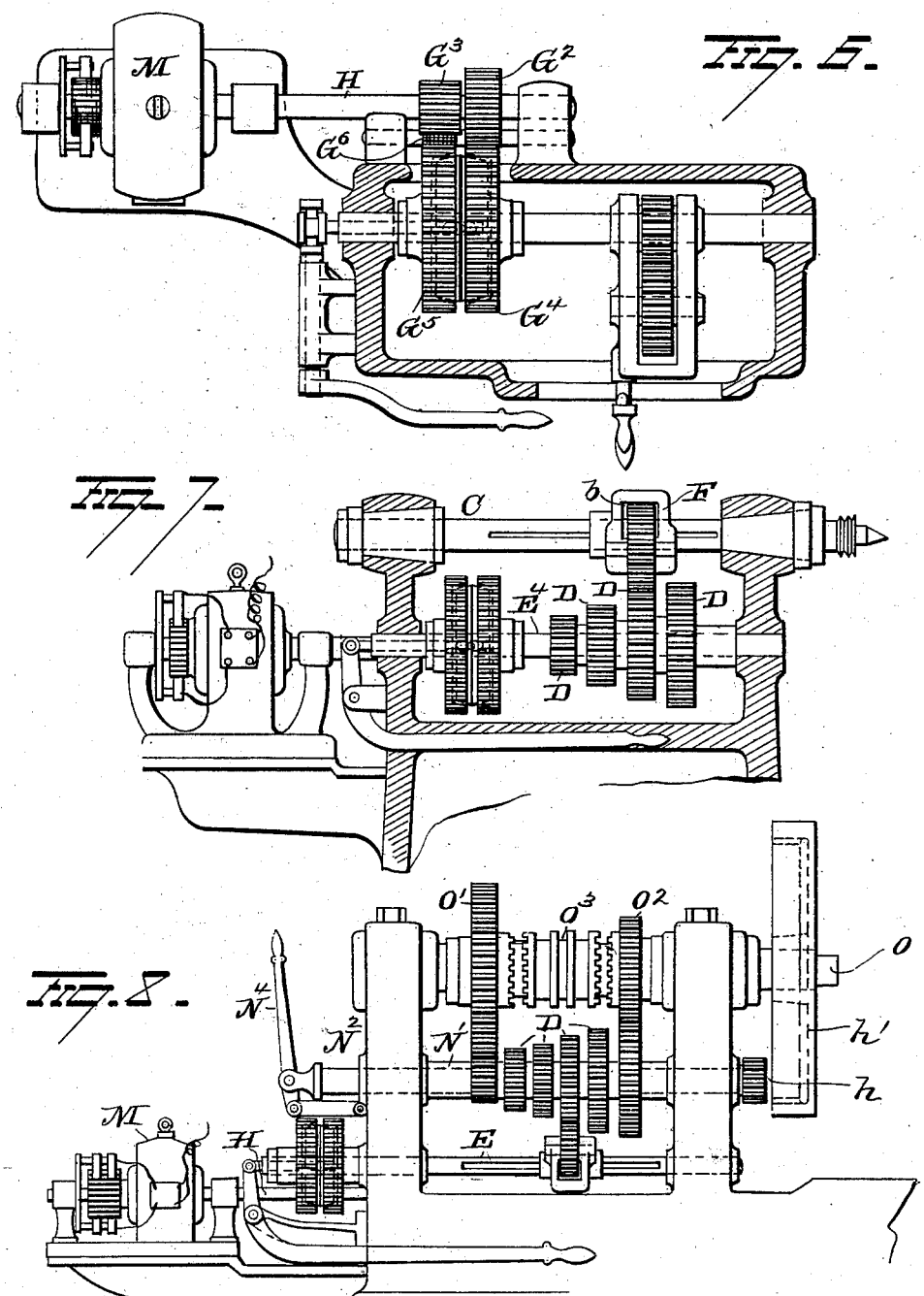

UNITED STATES PATENT OFFICE.

WENDELL P. NORTON, OF TORRINGTON, CONNECTICUT.

SPEED CHANGING AND REVERSING MECHANISM.

SPECIFICATION forming part of Letters Patent No. 691,963, dated January 28, 1902.

Application filed November 3, 1900. Serial No. 35,410. (No model.)

*To all whom it may concern:*

Be it known that I, WENDELL P. NORTON, of Torrington, in the county of Litchfield and State of Connecticut, have invented certain new and useful Improvements in Speed Changing and Reversing Mechanism; and I do hereby declare the following to be a full, clear, and exact description of the invention, such as will enable others skilled in the art to which it appertains to make and use the same.

My invention relates to an improvement in variable and reversible speed power-transmitting devices designed particularly for imparting variable speed directly to the live-spindles of lathes of various types and which are specially constructed and designed for turning, cutting screws, milling, boring, or other work, the object being to provide means for readily and quickly changing the speed of the spindle and reversing the direction of rotation of same without stopping the motor or, if power-transmitting belts be used, without shifting or disturbing the latter.

With these ends in view my invention consists in the combination, with a live-spindle and driving-shaft, of speed-changing gearing for varying the speed of rotation of the spindle, said gearing comprising a cone of gears and a tumbler-gear adapted to be thrown into and out of engagement with any one of the gears of the cone.

My invention further consists in the combination, with a live-spindle and counter-shaft, of speed-changing gearing for varying the speed of rotation of the spindle, consisting of a cone of gears and a tumbler-gear adapted to be thrown into and out of mesh with any one of the gears of the cone, the cone of gears and tumbler-gear being mounted on said spindle and counter-shaft.

My invention further consists in the combination, with a live-spindle or shaft carrying cone or step gears and a tumbler-shaft, of shiftable gears connecting the tumbler-shaft and the cone or step gears.

My invention further consists in a live-spindle carrying cone or step gears, a tumbler-shaft, a driving-shaft, gearing connecting the tumbler-shaft and spindle, and disconnecting and reversing mechanism intermediate the driving-shaft and spindle.

My invention also consists in the parts and combinations of parts, as will be more fully described, and pointed out in the claims.

Figure 2:
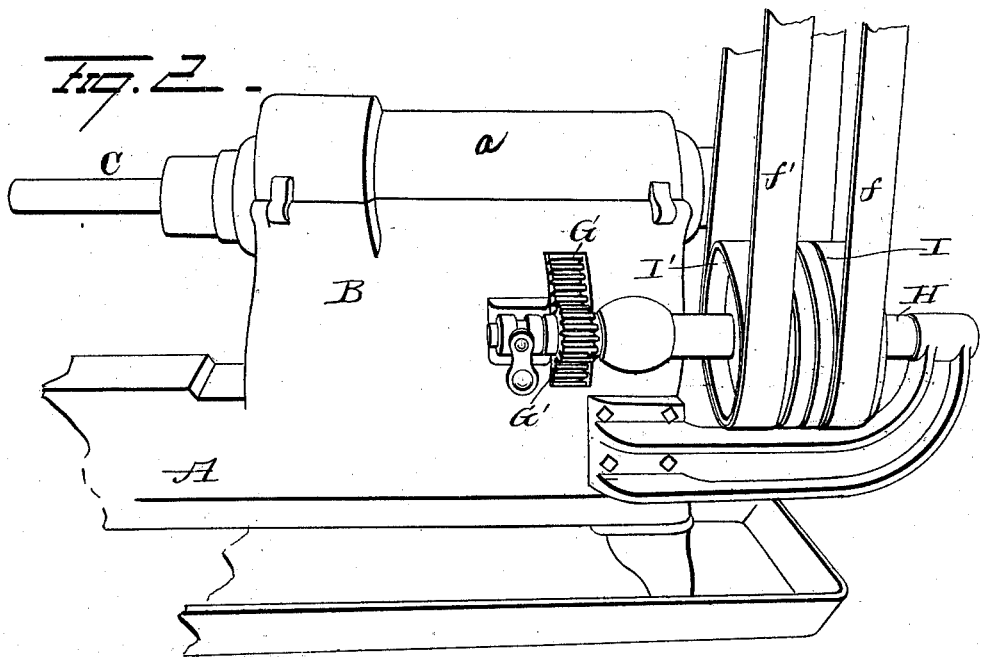

In the accompanying drawings, Figure 1 is a view in elevation of a machine embodying my invention, the lid or cover of the head-stock being raised. Fig. 2 is a view in rear elevation of same, the lid or cover being closed. Fig. 3 is a view in horizontal section of Figs. 1 and 2, taken under the spindle. Fig. 4 is a view, partly in section and partly in elevation, the casing being removed, showing a modified form. Fig. 5 is a view representing in dotted lines the relative positions of the cone-gear, the tumbler-gear, and the reversing-gears shown in Figs. 4 and 6. Fig. 6 is a longitudinal section of the construction shown in Fig. 4, taken under the live-spindle and showing the sides of the casing, and Figs. 7 and 8 are views of modified forms.

While I have illustrated my improvements in connection with an engine-lathe or screw-machine, I would have it understood that I do not confine the application of these improvements to any particular style of lathe, but reserve to myself the right to employ the devices in connection with the various types of lathes designed for turning, cutting screws, milling, boring, or other work.

A represents the bed carrying the head-stock B. This head-stock is in the form of a hollow box or casing and is provided with a hinged lid or cover $a$, which latter when closed, as shown in Fig. 2, covers, conceals, and protects the greater part of the gearing.

Mounted in the ends of the head-stock or casing is the live-spindle C, which carries and rotates the tool or work being operated upon, and secured on the spindle is the step or cone gearing D. Located in a plane below the live-spindle is the tumbler-shaft E, on which is slidingly mounted the tumbler-lever F. This lever F is rectangular and open at its top and one end and is slidingly mounted at its open end on the tumbler-shaft E. Located within the open end of this tumbler-lever is the sliding pinion $b$, which latter is free to slide on the tumbler-shaft, but is held against rotation thereon, and carried by the lever F and meshing with pinion $b$ is the tumbler-gear $c$, adapted to engage any one of the gears constituting the cone D. The lever F is provided with a handle F′, which passes out through the inclined slot $c'$ in the front of the head B and carries a spring-actuated latch $d$, adapted to enter holes $e$, formed in the head, for locking the lever F in position with its tumbler-gear $c$ in engagement with one of the cone-gears.

In the drawings I have shown the cone made up of four gears and have provided the head B with four vertical slots $c^2$, all communicating with the inclined slot $c'$, the slots $c^2$ being so located with relation to the gears constituting the cone that when the lever F' is resting within a vertical slot the tumbler-gear $c$ is in engagement with the corresponding gear on the cone. Hence by releasing the latch $d$, depressing the handle F, and shifting its position to another vertical slot $c^2$ in order to change the speed the tumbler-gear $c$ is first disengaged from the cone-gear, shifted to a position under and into engagement with another gear, and then locked. This change of speed of the spindle C can be accomplished, as will be hereinafter explained, without stopping the motor.

Keyed to the counter-shaft E is the pinion G, which latter projects through the rear side of the head of the machine and meshes with the pinion G' on the driving-shaft H. This driving-shaft is supported in suitable bearings, and in Figs. 1, 2, and 3 it is shown supporting two loose pulleys I and I', driven by oppositely-running belts $ff'$.

Keyed to shaft H, so as to revolve therewith, but free to slide a limited distance thereon, is the friction-pulley $I^2$. This pulley $I^2$ is located between the belt-pulleys I and I' and is overlapped by the latter, the overlapping edges of the belt-pulleys being so related to the surface of the friction-pulley that when the latter is midway the two belt-pulleys it is disengaged from both, thus leaving both belt-pulleys free to revolve loosely on the shaft, and by moving the friction-pulley laterally it engages the overlapping rim of the belt-pulley toward which it is moved and locks the latter to the driving-shaft, and thus imparts the motion of the belt thereon to the spindle through the mechanism previously described. From the above it is evident that the direction of rotation of the spindle or shaft can be reversed without disturbing or shifting either belt. I make no claim in this application to this friction-pulley and its arrangement with relation to the belt-pulleys, as the same is claimed in my United States Patent No. 622,160, granted to me March 28, 1899.

The driving-shaft H is provided with a central bore leading from its front to a point adjacent to the friction-pulley $I^2$ for the passage of the shifting rod J, which latter is connected at its inner end to the hub of the friction-pulley and is provided on its outer end with a grooved collar engaged by the pins $h'$ of yoke $h$, carried by the shaft K. This shaft passes through the head B from the rear to the front and is provided on its front end with the lever L, the movements of which operate to release both belt-pulleys or clutch one or the other to the drive-shaft.

In the lathes employing cone-pulleys on the live-spindles a change of speed can only be accomplished by shifting the belt, while with my machine varying speeds may be imparted directly to the live-spindle from a constant-speed source of power simply by shifting the portion of the tumbling pinion and a reversal in the direction of rotation obtained by simply shifting the position of the friction-pulley.

In the construction shown in Figs. 4 and 6 I have shown the main driving-shaft H coupled up directly to an electric motor M and have located the reversing mechanism on the counter-shaft E. In the construction shown in Fig. 3 a single gear G takes the power from the pinion G' on the main driving-shaft. In the construction shown in Figs. 4 and 6 I employ two gears $G^4$ and $G^5$ in lieu of the single gear G of Fig. 3 and provide each gear with an overhanging rim for engagement with the friction-pulley $I^2$, mounted on the tumbler-shaft between the gears $G^4$ and $G^5$. This pulley $I^2$ is connected to the shifting rod J, which passes through the central bore in the counter-shaft out through the rear end of the head and is connected to the shifting lever L. The operation of this friction-pulley in connection with the gears is precisely the same as its operation in connection with the pulleys I and I', previously described. The two gears $G^4$ and $G^5$ are loose on the tumbler-shaft, the gear $G^4$ meshing with pinion $G^2$ on driving-shaft H, while the gear $G^5$ meshes with the idle gear $G^6$, the latter in turn meshing with pinion $G^3$ on the driving-shaft H. By imparting motion to the tumbler-shaft through gear $G^4$ the direction of motion of the latter will be the reverse of the motion imparted to it through the gear $G^5$.

In the construction shown in Fig. 7 I have shown the step or cone gearing D on a counter-shaft $E^4$ and the tumbler-lever F and its gear mounted directly on the spindle C, the sliding pinion $b$ being slidingly mounted on the spindle. In other respects it is identical with the construction shown in Figs. 4 and 6.

In the construction shown in Fig. 8, which is designed for heavier lathes, I employ in addition to the tumbler-shaft and spindle a counter-shaft $N^1$, the former of which carries the sliding pinion and tumbler-lever, while the counter-shaft N' carries the step or cone gearing. The tumbler-shaft E carries the twin gears and friction-pulley, coupled up to the main driving-shaft H in a manner similar to that shown in Fig. 6, while the counter-shaft N', which is hollow, carries the step or cone gears and the sliding shaft $N^2$, the latter being keyed to shaft N', so as to prevent independent rotation thereof. This sliding shaft is moved longitudinally within the counter-shaft N' by the lever $N^4$ and is provided at one end with a pinion $h$, which may be made to mesh with internal gearing on the face-plate $h'$. The spindle O carries gears $O'$ $O^2$, loosely mounted thereon, either of which can be locked to the spindle by the clutch $O^3$. The larger gear $O'$ meshes with the smallest gear of the cone, while the smaller gear $O^2$ meshes with the largest gear of the cone. With this construction it will be observed that by throwing pinion $h$ into mesh with the internal gear on the face-plate $h'$ I can secure as many changes of speed as there are gears in the cone, and by withdrawing gear $h$ from the teeth of face-plate $h'$ and locking either gear $O'$ or $O^2$ to the spindle I can also change the speed, and vary the latter combination by shifting the tumbler on its shaft so as to engage a larger or smaller gear of the cone.

It is evident that many slight changes might be resorted to in the relative arrangement of parts shown and described without departing from the spirit and scope of my invention. Hence I would have it understood that I do not wish to confine myself to the exact construction of parts herein shown and described; but, Having fully described my invention, what I claim as new, and desire to secure by Letters Patent, is—

1. The combination with a live-spindle and driving-shaft, of speed-changing gearing for varying the speed of rotation of the spindle, said gearing comprising a cone of gears and a tumbler-gear adapted to be thrown into and out of engagement with any one of the said gears of the cone.

2. The combination with a live-spindle, and tumbler-shaft, of speed-changing gearing for varying the speed of rotation of the spindle, consisting of a cone of gears and a tumbler-gear adapted to be thrown into and out of mesh with any one of the gears of the cone, the cone of gears and tumbler-gear being mounted on said spindle and tumbler-shaft.

3. The combination with a lathe-spindle and driving-shaft, of speed-changing gearing for varying the speed of rotation of the spindle, said gearing comprising a cone of gears, and a tumbler-gear adapted to be thrown into and out of engagement with any one of the gears of the cone, and reversing-gear located between the speed-changing gearing and the mechanism through which power is transmitted to the driving-gear.

4. The combination with a live-spindle carrying a step or cone gear, of a tumbler-shaft, a tumbler-gear actuated thereby, means for shifting the tumbler-gear, a driving-shaft, and reversing mechanism located between the speed-changing gearing and the mechanism through which power is transmitted to the driving-gearing.

5. The combination with a live-spindle carrying a step or cone gear, of a tumbler-shaft, a tumbler-gear actuated thereby, means for shifting the tumbler-gear, and reversing mechanism carried by the tumbler-shaft.

In testimony whereof I have signed this specification in the presence of two subscribing witnesses.

WENDELL P. NORTON.

Witnesses:
A. W. BRIGHT,
W. CLARENCE DUVALL.